United States Patent
Narahara et al.

(10) Patent No.: US 6,814,118 B2
(45) Date of Patent: Nov. 9, 2004

(54) PNEUMATIC TIRE WITH SPECIFIED AIRTIGHT LAYER ON INNER SURFACE

(75) Inventors: Yasuhiro Narahara, Kobe (JP); Takuji Kusumoto, Kobe (JP); Yoshiyuki Kawai, Kobe (JP); Atsushi Yamakage, Kobe (JP); Yutaka Kuroda, Kobe (JP); Masayuki Sakamoto, Kobe (JP); Toru Nishikawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 206 days.

(21) Appl. No.: 09/968,542

(22) Filed: Oct. 2, 2001

(65) Prior Publication Data

US 2002/0066512 A1 Jun. 6, 2002

(30) Foreign Application Priority Data

| Oct. 3, 2000 | (JP) | 2000-303906 |
| Oct. 3, 2000 | (JP) | 2000-303907 |
| Oct. 3, 2000 | (JP) | 2000-303908 |
| Oct. 3, 2000 | (JP) | 2000-303909 |
| Oct. 3, 2000 | (JP) | 2000-303910 |

(51) Int. Cl.$^7$ .............................. B60C 1/00; B60C 5/14
(52) U.S. Cl. ........................ 152/510; 152/548; 152/564
(58) Field of Search ............................... 152/510, 564, 152/548

(56) References Cited

U.S. PATENT DOCUMENTS 6,148,889 A  11/2000  Minami et al.

FOREIGN PATENT DOCUMENTS

JP  10193910 A  *  7/1998

OTHER PUBLICATIONS

Abstract of JP–10193926A, Jul. 28, 1998, The Yokohama Rubber Co. Ltd.
Abstract of JP–10193910A, Jul. 28, 1998, The Yokohama Rubber Co. Ltd.

* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire including a carcass containing a ply of cords defining the innermost reinforcing cord layer extending between bead portions, and an airtight layer disposed inside the cords of the carcass ply along the inner surface of the tire, covering substantially the entire inner surface of the tire, wherein the airtight layer is made of air-impermeable rubber including at least 10 weight % of halogenated butyl rubber and/or halogenated isobutylene-paramethyl styrene copolymer in its rubber base, and the thickness of the airtight layer measured from the inner surface of the tire to the cords of the carcass ply is in a range of from 0.2 to 0.7 mm.

6 Claims, 9 Drawing Sheets

PNEUMATIC TIRE WITH SPECIFIED AIRTIGHT LAYER ON INNER SURFACE

The present invention relates to a pneumatic tire having an improved airtight layer capable of reducing tire weight.

In recent years, from an environmental aspect, pneumatic tires are required to reduce their weight. Therefore, various proposals were have been made. For example, the laid-open Japanese patent applications JP-A-H06-156007 and JP-A-H08-113007 disclose a pneumatic tire wherein, a cord ply rubberized with an air-impermeable rubber compound is used in the carcass, and the conventional inner liner is eliminated. The tire weight is therefore, reduced accordingly, In practice, however, it is very difficult to uniformly reduce the thickness of rubber inside the carcass because during the vulcanization of the tire, the tire inner surface is pressed by an inflated bladder and the bladder rubs the inside of the carcass ply. If the bladder touches the carcass cords, the carcass cords are exposed, and not only the airtightness but also the resistance to humidity is decreased causing a deterioration in the durability.

SUMMARY OF THE INVENTION

Therefore, a principal object of the present invention is to provide a pneumatic tire in which, in order to reduce the tire weight, the rubber thickness of an airtight layer disposed along the inner surface of the tire is minimized uniformly, without creating defects such as breakage.

Another object of the present invention is to provide an improved airtight layer capable of minimizing its thickness without sacrificing its airproofing power.

According to the present invention, a pneumatic tire is provided which comprises a tread portion, a pair of sidewall portions, a pair of bead portions, a carcass comprising a ply of cords defining the innermost reinforcing cord layer extending between the bead portions, and an airtight layer disposed along the inner surface of the tire, covering substantially the entire inner surface of the tire, the airtight layer being made of an air-impermeable rubber including at least 10 weight % of a halogenated butyl rubber and/or a halogenated isobutylene-paramethyl styrene copolymer in its rubber base, and having a thickness of the airtight layer measured from the inner surface of the tire to the cords of the carcass ply in a range of from 0.2 to 0.7 mm.

BRIEF DESCRIPTION OF THE DRAWINGS

Embodiments of the present invention will now be described in detail in conjunction with the accompanying drawings wherein.

DETAILED DESCRIPTION OF THE INVENTION

Figure 1:
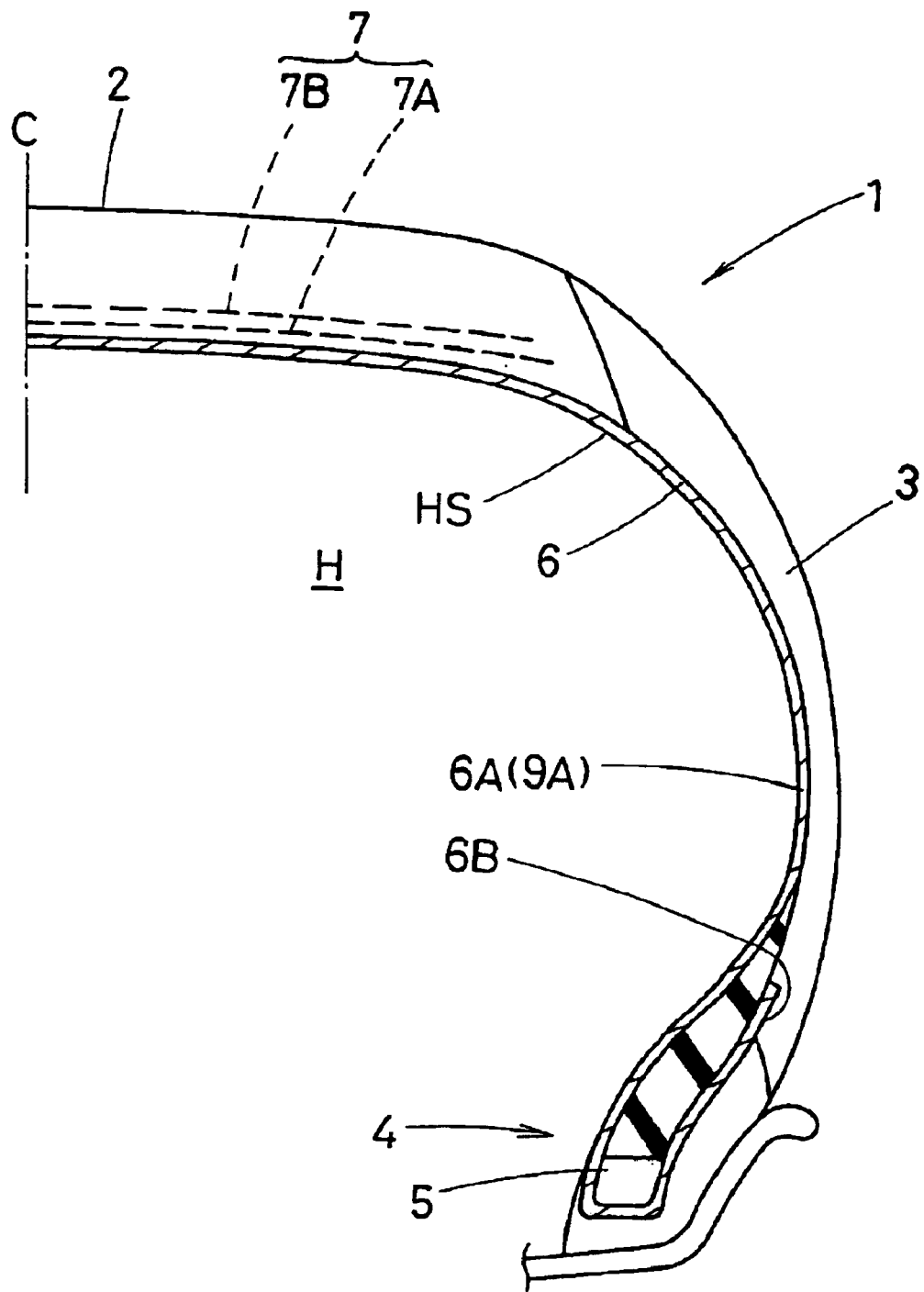
FIG. 1 is a schematic cross sectional view of a pneumatic tire according to the present invention.

In the drawings, a pneumatic tire 1 according to the present invention comprises a tread portion 2, a pair of sidewall portions 3, and a pair of bead portions 4 with a bead core 5 disposed thereon. As shown in FIG. 1, the tire 1 is reinforced with a carcass 6 extending between the bead portions 3 through the tread portion 2 and sidewall portions 3 and a thread reinforcing belt disposed radially outside the crown portion of the carcass 6 in the tread portion 2.

The embodiment schematically shown in FIG. 1 is a passenger car tire. However, the present invention can be applied to various pneumatic tires.

The belt comprises a breaker 7 and optionally a band (not shown).

The breaker 7 is composed of at least two cross piles 7A and 7B of high modulus cords laid parallel to each other at an angle of from 10 to 35 degrees with respect to the tire equator.

The band is disposed on the radially outside of the breaker 7 and the cord angle with respect to the tire equator is almost zero or at a small angle of at most 10 degrees.

The carcass 6 on the one hand, comprises a ply 9A of cords 10 provided as the innermost reinforcing cord layer extending at least between the bead portions 4.

The carcass 6, on the other hand, comprises at least one ply 9 of cords 10 arranged at an angle alpha of 75 to 90 degrees with respect to the tire equator, and extending continuously between the bead portions 4 through the tread portion 2 and sidewall portions 3, and turned up around the bead core 5 in each bead portion from axially inside to the axially outside so as to form a pair of turned up portions 6B with the main portion 6A provided therebetween. The carcass 6 may be composed of a single ply 9. In this case, the ply 9A is defined by the main portion 6A. Further, the carcass 6 may be composed of two piles 9 both of which are turned up from the inside to the outside as explained above. In this case, the ply 9A is defined by the main portion 6A of the inner carcass ply. Furthermore, the carcass 6 may be composed of the above-mentioned ply 9 turned up from the inside to the outside and another ply which is disposed outside the ply 9 and turned up reversely from the outside to the inside or not turned up so as to terminate in the bead portion. In this case, the ply 9A is defined by the main portion 6A of the carcass ply 9. In this case, the ply 9A is defined by the main portion 6A of the carcass ply 9.

Airtight Layer

Figure 2A:
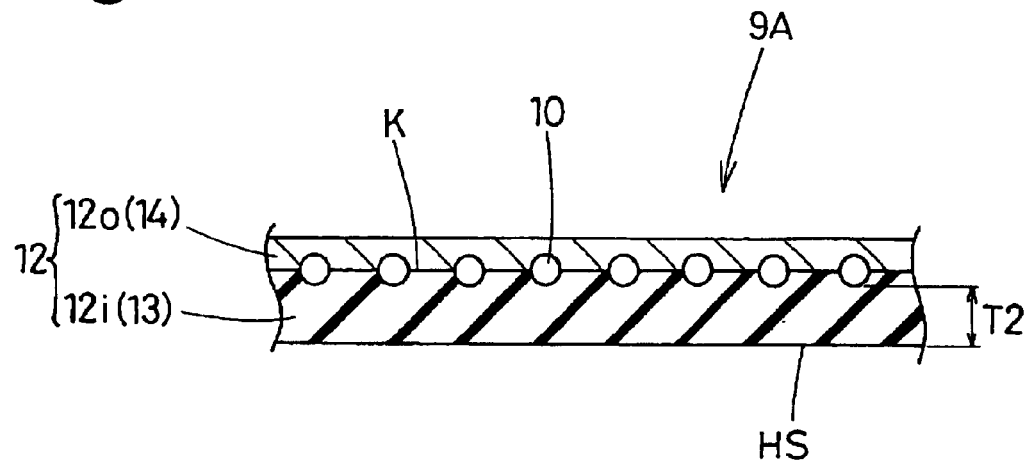
FIGS. 2A and 2B are enlarged schematic cross sectional views, each showing an example of the arrangement of the airtight layer and the innermost carcass cords.
Figure 2B:
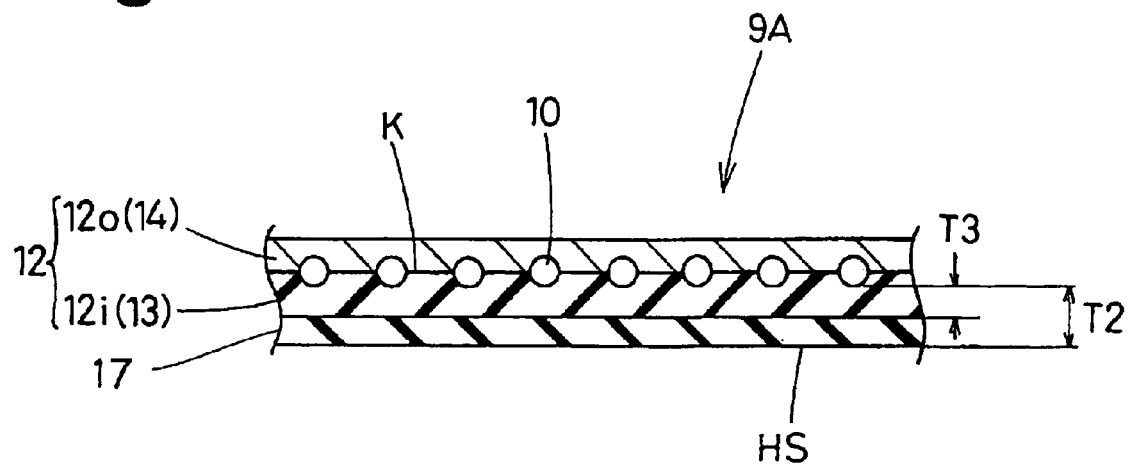

According to the present invention, an airtight layer is disposed along the inner surface HS of the tire, covering the substantially entire surface HS. Here, as shown in FIG. 2A and FIG. 2B, the airtight layer is defined by a rubber layer between the tire inner surface HS and the innermost cords 10, namely, the carcass cords 10 of the ply 9A. The thickness T2 of the airtight layer measured from the tire inner surface HS to the carcass cords 10 is decreased into a range of from 0.2 to 0.7 mm.

The airtight layer is made of one or more kinds of air-impermeable rubber compounds, including a topping rubber 12 of the carcass ply 9A.

In the examples shown in FIGS. 2A and 2B, the topping rubber 12 of the carcass ply 9A has a double layered structure comprising an inner topping rubber 12i made of an air-impermeable rubber compound 13, and an outer topping rubber 12o made of another kind of diene-base rubber 14 which is not air-impermeable. The boundary K between the inner topping rubber 12i and outer topping rubber 12o is preferably laid outside the innermost points of the carcass cords 10 as shown in FIGS. 2A and 2B. In these two examples, the boundary K reaches to the center of the cords.

The outer topping rubber 12o, however, may be made of the same air-impermeable rubber compound 13 or a similar air-impermeable rubber compound. In case of an air-impermeable rubber compound which is similar to but different from the inner topping rubber 12i, the boundary K may be laid inside the carcass cords 10.

Air-impermeable Rubber Compound

The air-impermeable rubber compound 15 which is used as carcass cord topping rubber includes, as its rubber base, 10 to 50 weight % of halogenated butyl rubber and/or halogenated isobutylene-paramethyl styrene copolymer, and 90 to 50 weight % diene rubber so as to provide low air-permeability and strong adhesion to the cords 10 and an other abutting rubber 14. Further, the air-impermeable rubber compound 13 includes 45 to 60 parts by weight of carbon black with respect to 100 parts by weight of the rubber base.

Here, the diene rubber means natural rubber, butadiene rubber, styrene-butadiene rubber, isoprene rubber, chloroprene rubber, acrylonitrile butadiene rubber and the like, which may be used alone or in combination. For the halogenated butyl rubber, chlorinated butyl rubber and/or brominated butyl rubber may be used. Hereinafter, the halogenated butyl rubber and halogenated isobutylene-paramethyl styrene copolymer are called "low-air-permeability rubber component(s)".

From the point of view of adhesiveness, it is preferable that the diene rubber is not less than 65 weight % and the total of the low-air-permeability rubber component(s) is not more than 35 weight %. And the isobutylene content of the halogenated isobutylene-paramethyl styrene copolymer is in a range of from 89 to 97 weight %, more preferably 89 to 95 weight %, still more preferably 89 to 93 weight %.

The above-mentioned carbon black preferably has (1) (a) an iodine adsorption number of 80 to 125 mg/g or (b) a specific surface area (nitrogen adsorption method) of 80 to 120 m2/g, and (2) (c) a dibutyl phthalate adsorption number of 70 to 100 ml/100 g or (d) dibutyl phthalate adsorption number (compressed sample) of 70 to 90 ml/100 g, namely, (a)+(c) or (a)+(d) or (b)+(c) or (b)+(d). Here, the above-mentioned iodine adsorption number, specific surface area (nitrogen adsorption method), dibutyl phthalate adsorption number, and dibutyl phthalate adsorption number (compressed sample) are measured according to the Japanese Industrial Standard K6217—"Testing methods of fundamental characteristics of carbon black for rubber industry", Sections 6, 7, 9 and 10, respectively.

By providing the carbon black with these parameters limited as above, even if the carbon black content is decreased in the above-mentioned range of from 45 to 60 parts by weight, sufficient reinforcement can be obtained together with flexibility in the vulcanized state. Thus, the crack resistance against bending deformation, tensile strength and the like may be improved.

Further, in the unvulcanized state of the rubber compound 13, the viscosity (Mooney viscosity) is increased to lessen the flow of rubber during vulcanizing. As a result, the above-mentioned rubber thickness T2 measured from the tire inner surface HS to the carcass cords 10 can be maintained stably in the above-mentioned range of from 0.2 to 0.7 mm.

If the iodine adsorption number is less than 80 mg/g or the specific surface area is less than 80 m2/g, then it is difficult to maintain the specific rubber thickness T2 because the unvulcanized rubber is provided with an excess liquidity or excess mobility. Further, the tensile strength and breaking strength of the vulcanized rubber tend to decrease.

If the iodine adsorption number is more than 125 mg/g or the specific surface area is more than 120 m2/g, then the hardness of the vulcanized rubber is liable to increase excessively to deteriorate ride comfort of the tire.

If the dibutyl phthalate adsorption number is less than 70 ml/100 g or the dibutyl phthalate adsorption number (compressed sample) is less than 70 ml/100 g, then the tensile strength is liable to become insufficient.

If the dibutyl phthalate adsorption number is more than 100 ml/100 g or the dibutyl phthalate adsorption number (compressed sample) is more than 90 ml/100 g, then the unvulcanized rubber is increased in the viscosity and the processibility becomes worse. Further, the bending fatigue resistance of the vulcanized rubber decreases.

If the carbon content is increased to compensate for the lack of the tensile strength, then the heat build-up in tire use unfavorably increases. Thus, this technique can not be adopted.

Usually, a plasticizer such as phthalic acid derivatives, softener, e.g. mineral oil, aroma oil and the like is used to improve the processibility and plasticity.

Such plasticizer may be used in this invention, but in this embodiment, in order to improve the adhesiveness of the air-impermeable rubber compound 13, a tackifier is added rather than plasticizer. For such tackifier, coumarone resin, phenol resin, terpene resin, petroleum hydrocarbon resin, rosin derivatives may be used. The content of the tackifier is set in a range of from 1 to 10, preferably 3 to 10, more preferably 3 to 8 parts by weight with respect to 100 parts by weight of the rubber base.

In the example shown in FIG. 2A, the airtight layer is made of the inner topping rubber 12i only, namely, the above-mentioned air-impermeable rubber compound 13.

Insulation Rubber Layer

In the example shown in FIG. 2B, the airtight layer is made of the inner topping rubber 121 (or the above-mentioned air-impermeable rubber compound 13) and a second air-impermeable rubber compound 15 which forms an insulation rubber layer 17.

When the thickness T2 is decreased to near its lower limit of 0.2 mm, it is difficult to maintain such a small thickness stably without partially breaking. In general, during vulcanizing a green tire in a mold, in order to press the green tire against the mold, the green tire is inflated to a high pressure using an inflatable bladder set inside the green tire. The bladder is very likely to come into contact with the innermost cords 10. As a result, the airtight layer breaks at the contact point. The insulating rubber layer 17 can solve this problem.

The insulation rubber layer 17 is provided inside the carcass ply topping rubber 12i as the innermost rubber layer which faces the tire cavity and comes into contact with a bladder during tire vulcanization.

The insulation rubber layer 17 is made of the second air-impermeable rubber compound 15 as mentioned above.

This compound 15 has ingredients which are similar to the above-mentioned ingredients of the air-impermeable rubber compound 13 but the content of the "low-air-permeability rubber component(s)" is increased, that is, the content thereof is set in a range of from 60 to 100 weight % and accordingly the remainder or the diene rubber is decreased into a range of 40 to 0 weight % so that the second air-impermeable rubber compound 15 is provided with fluidity, and the air-impermeable rubber compound 13 is provided with less fluidity during vulcanizing the tire.

Preferably, the ratio TQ1/T2 of a minimum torque TQ1 of the air-impermeable rubber compound 13 to a minimum torque TQ2 of the second air-impermeable rubber compound 15 is set in a range of not less than 1.1, and preferably at most 2.0. Here, the minimum torque is obtained from the cure curve obtained under the following conditions according to the Japanese Industrial Standard K6300—"Physical testing methods for unvulcanized rubber", Section 8.4 "Die vulcanization test-A method". That is, by oscillating a lower die, the torque transmitted from the lower die to an upper die through the specimen is measured. Conditions: Temperature of 170 deg. C.; Angularly amplitude of plus/minus 1 degrees; and Oscillation of 100 cycles/minute.

As to the thickness distribution, the thickness T3 of the air-impermeable rubber compound 13 measured from the innermost points of the cords 10 to the boundary between the topping rubber 12$i$ and the insulation rubber layer 17 is set in a range of from 0.1 to 0.2 mm when the boundary K or the outward extent of the air-impermeable rubber compound 13 is not laid inside an envelope of the centers of the cords. In this case too, the thickness T2 of the airtight layer as the total thickness of these two compounds 13 and 15 is set in the range of from 0.2 to 0.7 mm as mentioned above.

As a result, the force which the inner topping rubber 12$i$ receives from the inflated bladder during vulcanization is evened by the increased fluidity of the second air-impermeable rubber compound 15 and the force is decreased because the insulation rubber layer 17 functions as a lubricant. These effects and a effect by the less fluidity of the air-impermeable rubber compound 13 make the inner topping rubber thickness T3 stable.

Such a minimum torque difference TQ1–TQ2 may be provided by increasing the carbon content of the air-impermeable rubber compound 13 up to 10 weight % than the second air-impermeable rubber compound 15.

If the ratio TQ1/TQ2 exceeds 2.0 due to the increased carbon content of the air-impermeable rubber compound 13, it becomes difficult to rubberize the carcass cords.

In the vulcanized state, on the other hand, it is preferable that the complex elastic modulus $E^*1$ of the air-impermeable rubber compound 13 is not more than 5.5 MPa and the complex elastic modulus $E^*2$ of the second air-impermeable rubber compound 15 is not more than 5.0 MPa and smaller than the complex elastic modulus $E^*1$. Here, the complex elastic modulus is measured under the following conditions: Temperature of 70 deg.C.; Frequency of 10 Hz; Initial strain of 10%; and Dynamic distortion of plus/minus 1%.

If the complex elastic modulus $E^*1$ is more than 5.5 MPa, then the rigidity is liable to increase excessively to decrease the resistance to bending fatigue. If the complex elastic modulus $E^*2$ is more than 5.0 MPa, then the rigidity is liable to increase excessively to decrease the resistance to cracks.

Method of Making the Pneumatic Tire

Figure 3:
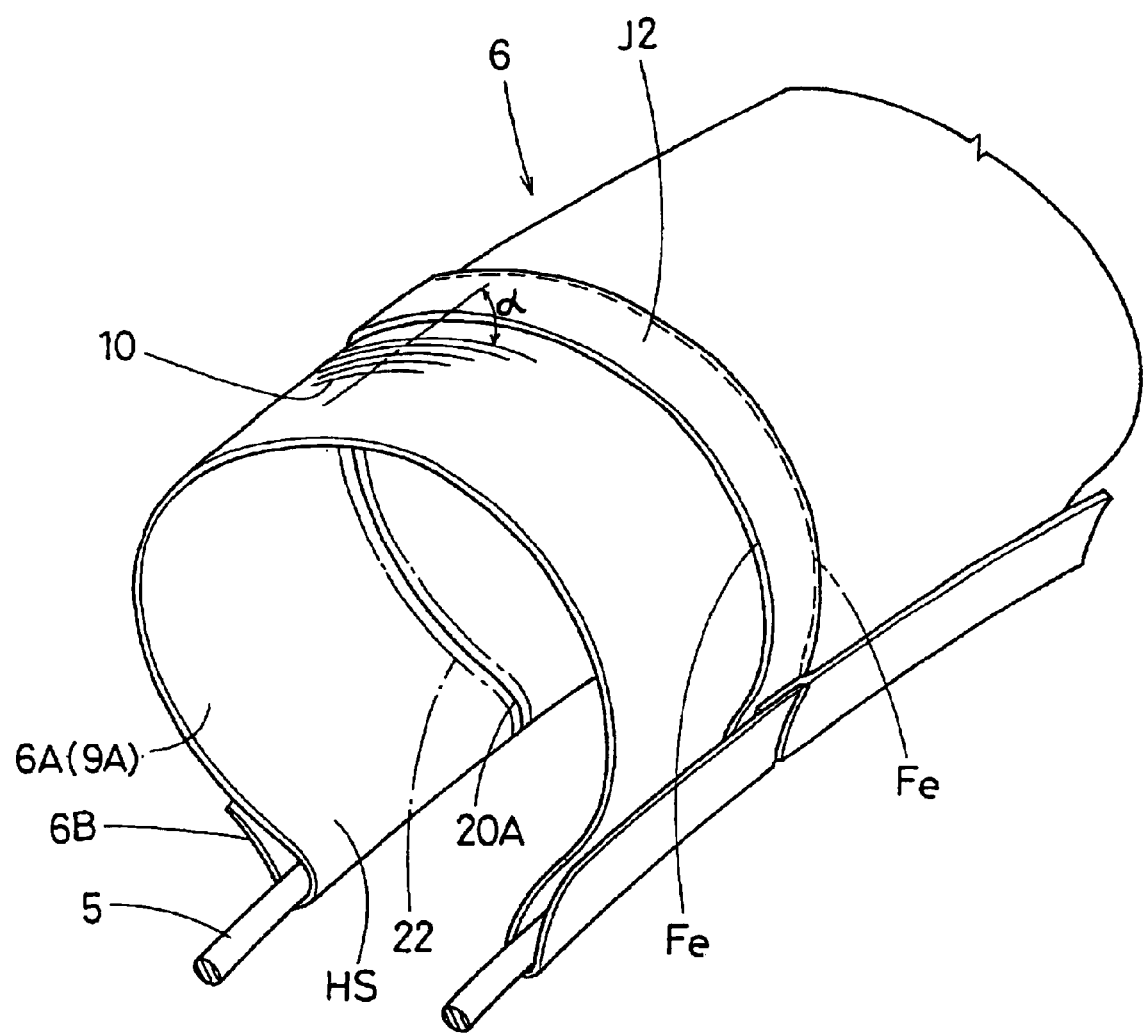
FIG. 3 is a diagram showing a raw carcass play material transformed into a toroidal shape resembling its final shape in the vulcanized tire.

Next, a method of making the pneumatic tire will be described. To be brief, the pneumatic tire is made as follows. A raw carcass ply material is wound around a tire building drum into a cylindrical shape. Two bead cores are set on the raw carcass ply material on the drum. The raw carcass ply material is transformed from the cylindrical shape to a toroidal shape by expanding the tire building drum while decreasing the distance between the bead cores (bead portions) as shown in FIG. 3. Reinforcing cord layers such as the belt and rubber components such as sidewall rubber, bead clinch rubber, tread rubber, etc. are applied at appropriate times. The green tire build as such is put in a mold, and an inflatable bladder is set inside the tire. The bladder is inflated during heating the green tire.

Method of Making the Raw Carcass Ply Material

The above-mentioned raw carcass ply material 16 is made as follows.

Figure 4:
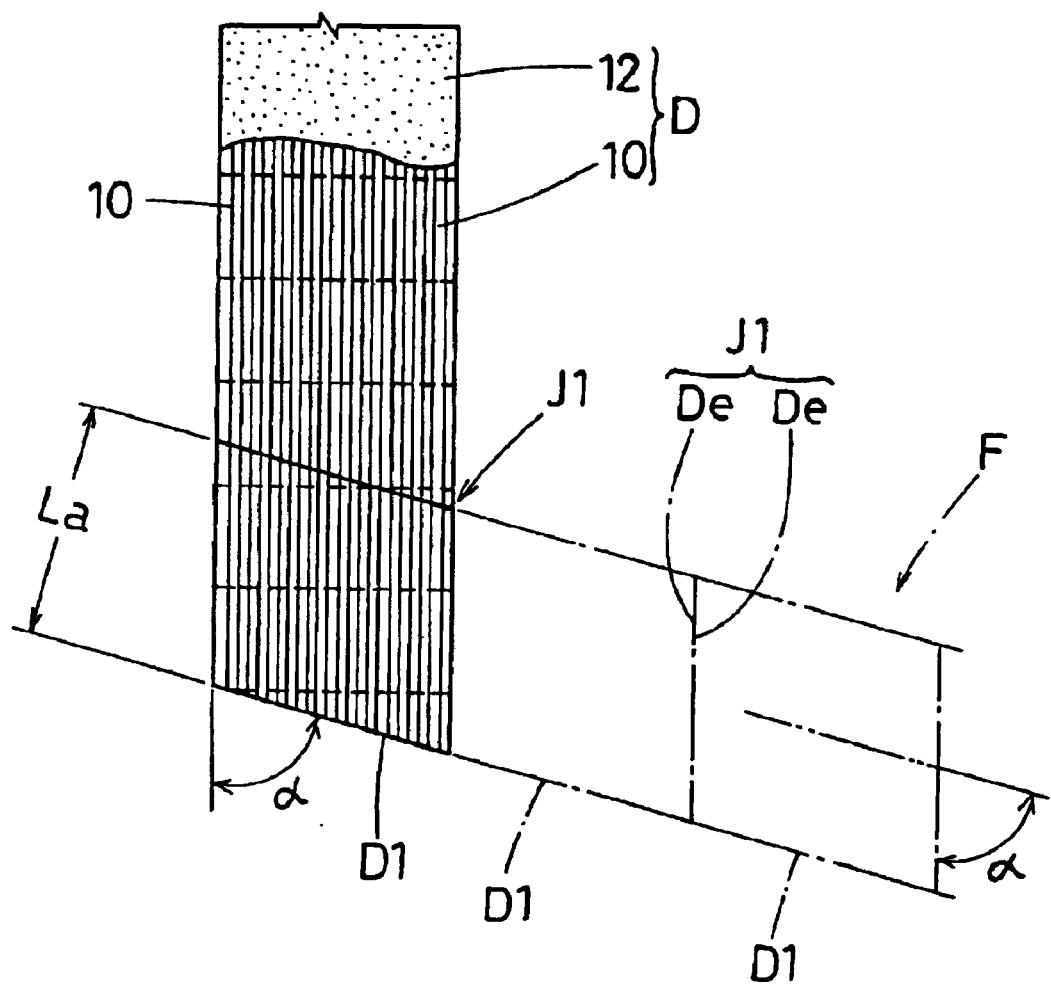
FIG. 4 is a diagram explaining a method for making a raw carcass ply material.

First, as shown in FIG. 4, a lengthy cord fabric D is made, wherein carcass cords 10 are laid parallel with each other at a predetermined cord count in the widthwise direction thereof so as to extend along the longitudinal direction of the fabric and the cords 10 are rubberized with topping rubber 12.

The cord fabric D is cut into pieces D1 according to the width La of the carcass ply material 16 and the carcass cord angle alpha with respect to the tire equator. To be precise, the inclination of the cutting line with respect to the longitudinal direction is alpha, and the spacing between the cutting lines in the longitudinal direction of the fabric D is equal to La×sin (alpha).

The cut pieces D1 are spliced by overlapping the side edges De while aligning the cut edges, whereby a lengthy spliced cord fabric F in which carcass cords are embedded in parallel with each other at the angle alpha with respect to the longitudinal direction thereof is formed.

By cutting the lengthy spliced cord fabric F into a certain length, the raw carcass ply material 16 is formed. (See FIG. 5A)

The raw carcass ply material 16 is wound around the tire building drum and the ends Fe thereof are spliced to make it cylindrical. (See FIG. 5B)

Figure 5A:
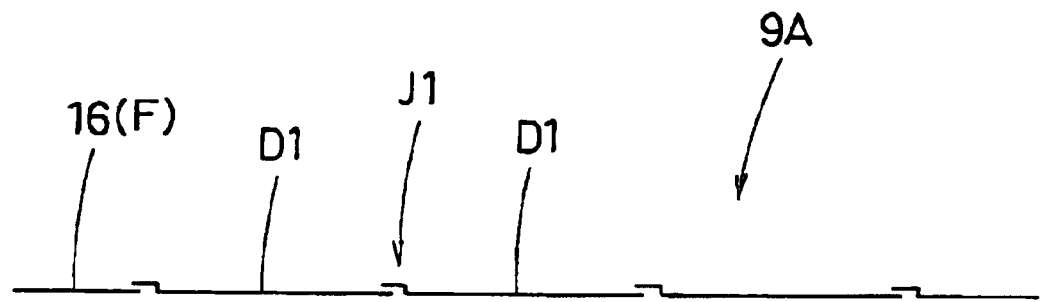
FIG. 5A is a diagram showing an example of the raw carcass ply material in a spread state.
Figure 5B:
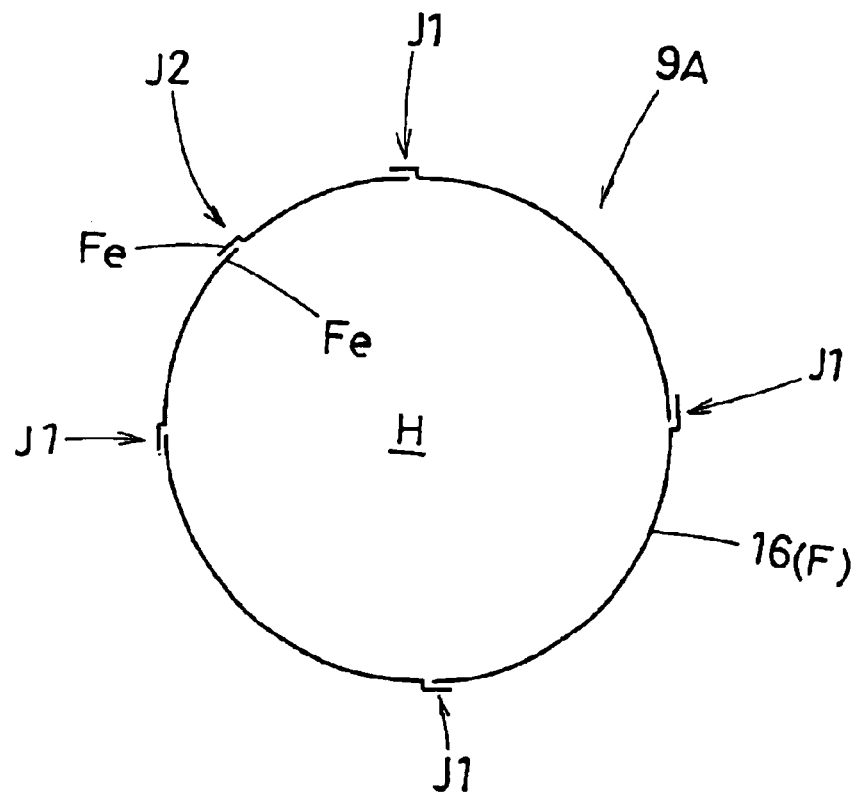
FIG. 5B is a diagram showing an example of the raw carcass ply material wound into a loop.
Figure 5C:
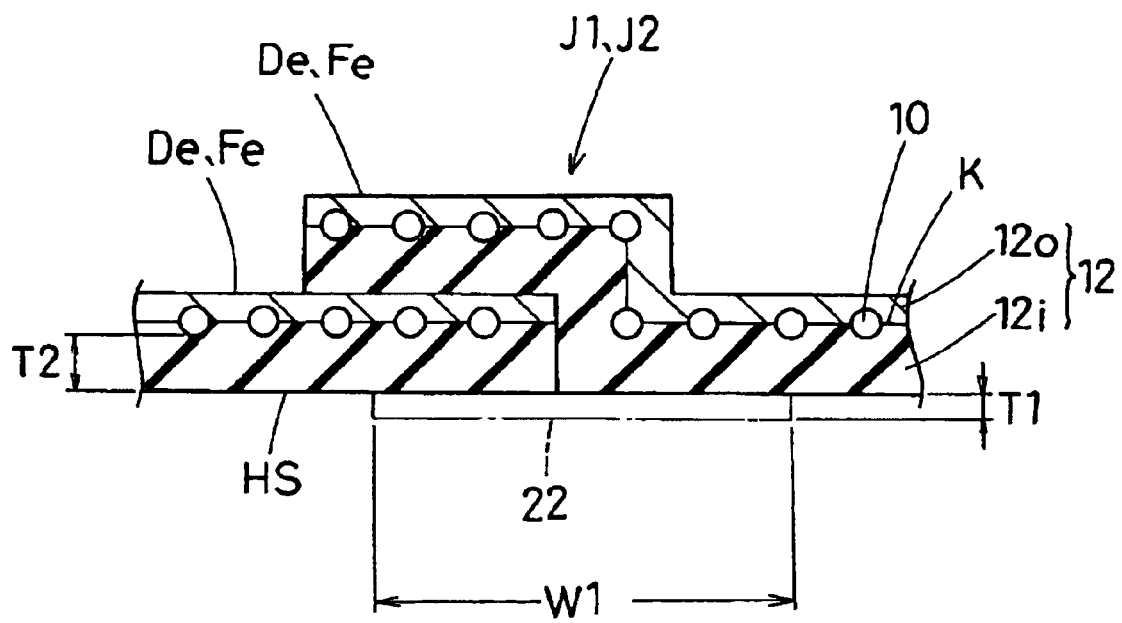
FIG. 5C is an enlarged schematic cross sectional view showing a splice joint thereto.

In the case of FIG. 2A where the airtight layer is made of one kind of rubber compound 13, the above-mentioned raw carcass ply material 16 may be used directly as shown in FIG. 5A and 5B. FIG. 5C shows the resultant splice joints (J1) between the side edges De and splice joint (J2)n between the ends Fe.

Figure 6A:
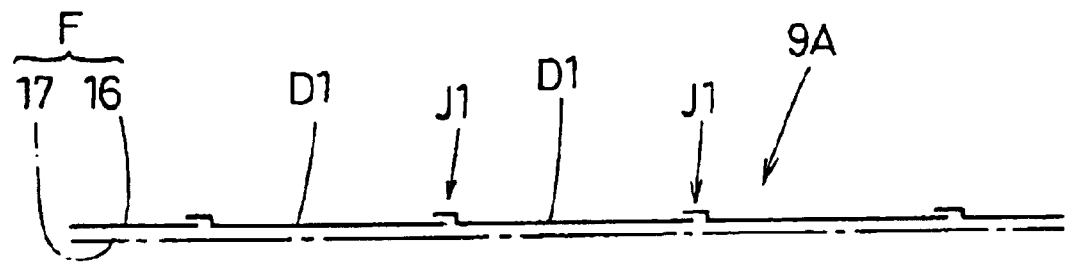
FIG. 6A is a diagram showing another example of the raw carcass ply material in a spread state.
Figure 6B:
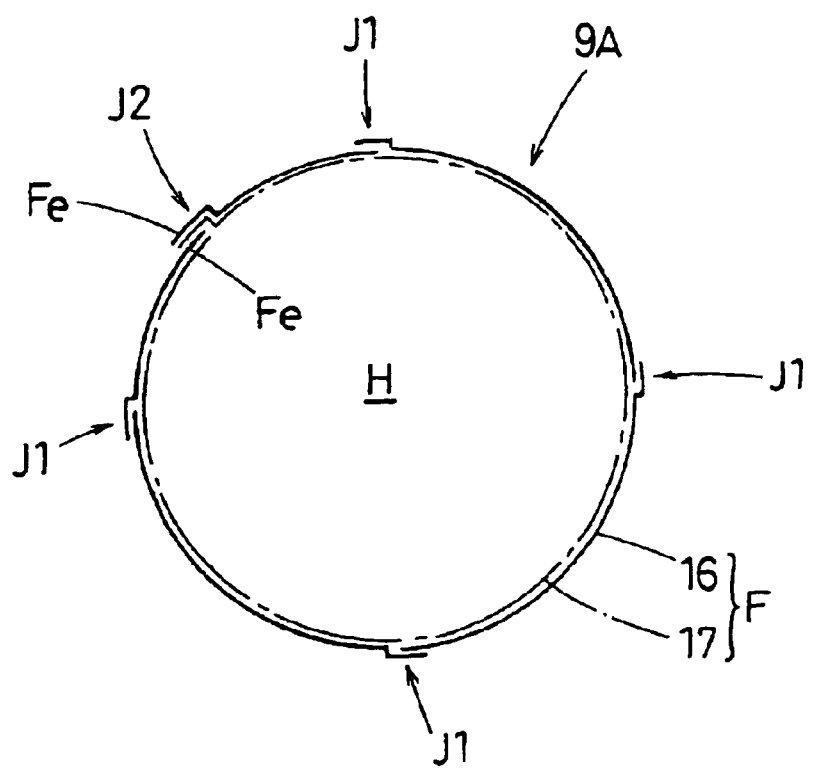
FIG. 6B is a diagram showing the raw carcass ply material wound into a loop.
Figure 6C:
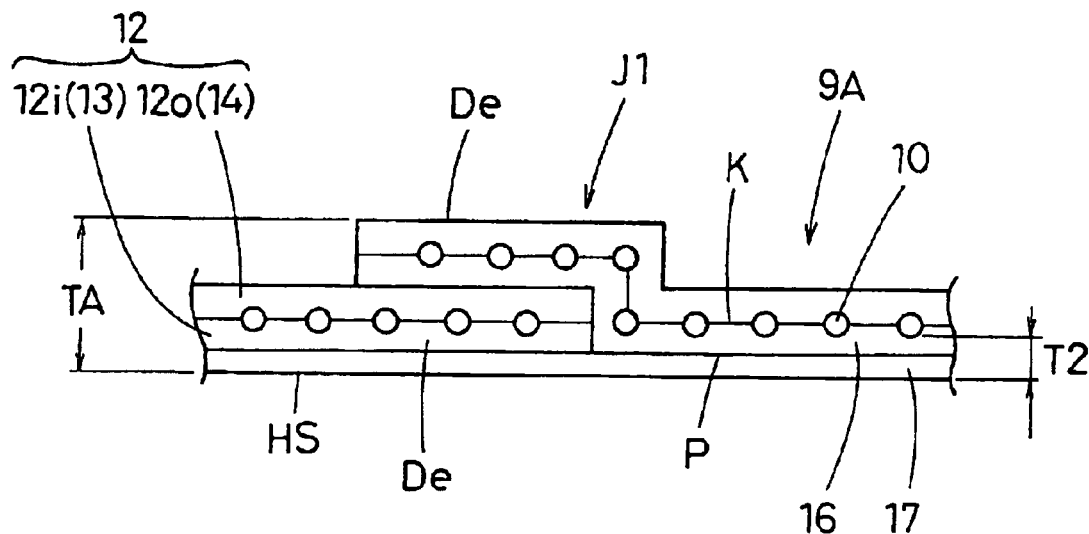
FIGS. 6C and 6D are enlarged schematic cross sectional views showing splice joints thereof.
Figure 6D:
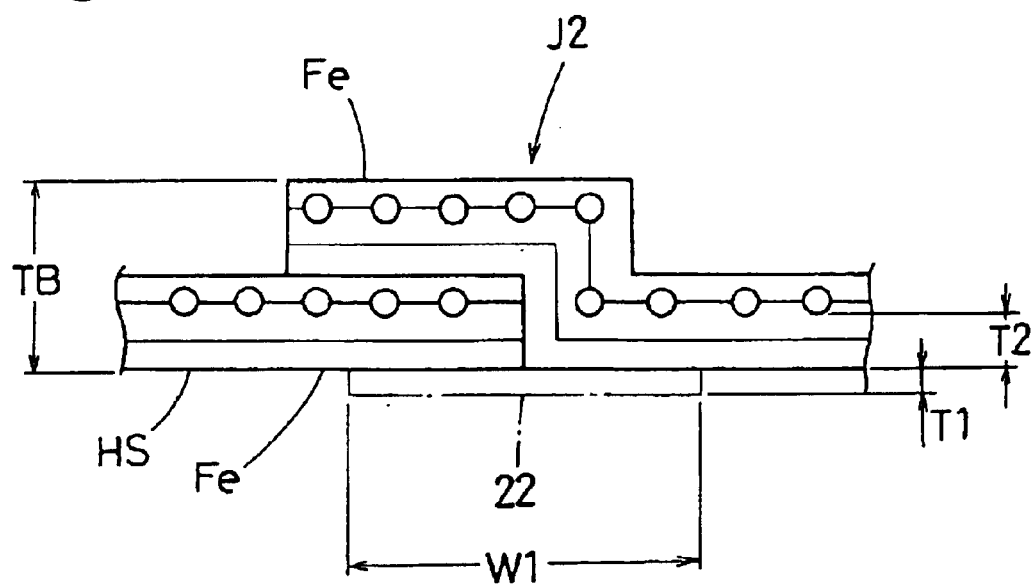

In case of FIG. 2B where the airtight layer is made up of the topping rubber 12$i$ and the insulation rubber layer 17, the insulation rubber layer 17 is applied to the inside of the lengthy spliced cord fabric F before cut into the raw carcass ply material 16. The raw carcass ply material 16 with the insulation rubber layer 17 shown in FIG. 6A is wound around the tire building drum and the ends Fe thereof are spliced to make it cylindrical as shown in FIG. 6B. FIG. 6C shows the resultant splice joints (J1) between the side edges De which are covered with the insulation rubber layer 17. FIG. 6D shows the resultant splice joint (J2) between the ends Fe which is not covered. Therefore, when viewed from the inside of the loop, only one joint (J2) is seen in FIG. 6B although a plurality of joints (J1 and J2) are seen in case of FIG. 5B.

As explained above, during vulcanizing the tire, the airtight layer comes into contact with the bladder.

In order to easily release the vulcanized tire therefrom, conventionally, mold lubricant is sprayed on the inner surface of the green tire.

In this invention, if such a mold lubricant or a similar release agent is applied to the inner surface of the green tire, in order to prevent a penetration of such a chemical which may cause a separation failure and lowering of airtightness, it is better to cover the above-mentioned joints J1 and J2 as they appear on the tire inner surface with a rubber patch 22 as shown in FIGS. 5C and 6D by an imaginary line.

The rubber patch 22 is an unvulcanized rubber tape whose thickness T1 is in a range of from 0.1 to 0.5 mm and width W1 is in a range of form 5 to 80 mm, preferably 25 to 50 mm. For the rubber patch, a rubber compound which is not air-impermeable may be used, but preferably an air-impermeable rubber compound is used which is the same as or similar to the air-impermeable rubber compound 13 or the second air-impermeable rubber compound 15 which is disposed as the innermost rubber layer and thus comes into contact with the patch.

The use of the rubber patch 22 is effective in preventing the penetration. In case of FIG. 5A, the patches to the joints (J1) may be applied in the state of a lengthy spliced cord fabric F in advance. But, in either case of FIG. 5A and FIG. 6A additional work to apply the patch to the joint (J2) is unavoidable.

In this embodiment, to save such trouble and time, the rubber patch 22 is not used and also a mold lubricant or release agent is not applied to the tire inner surface HS. It is however necessary to prevent bridging between the tire inner surface HS and the bladder. Therefore, the following release agent is applied to the surface of the bladder. In this example, a solution of an organic solvent such as gasoline and a combination of amide compound and silicon is used as the release agent. The solution is applied to the surface of the bladder and volatilized so that the surface is covered with a thin film.

Figure 7:
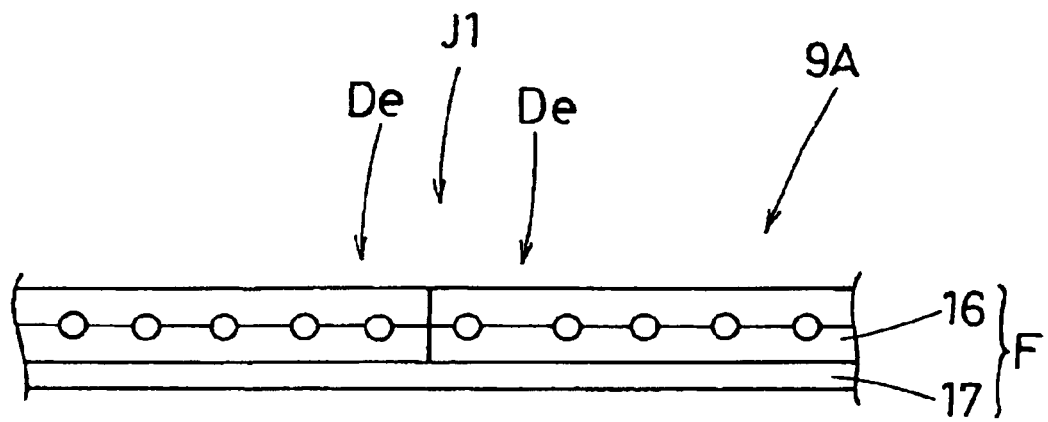
FIGS. 7 and 8 are enlarged schematic cross sectional views showing alternative butt joints and structures therefore.

FIG. 7 shows an alternative example of FIG. 6A. In this example, the side edges De of the cut pieces D1 are butt jointed. In this case, the insulation rubber layer 17 will be function as a base to retain the butted state.

Figure 8:
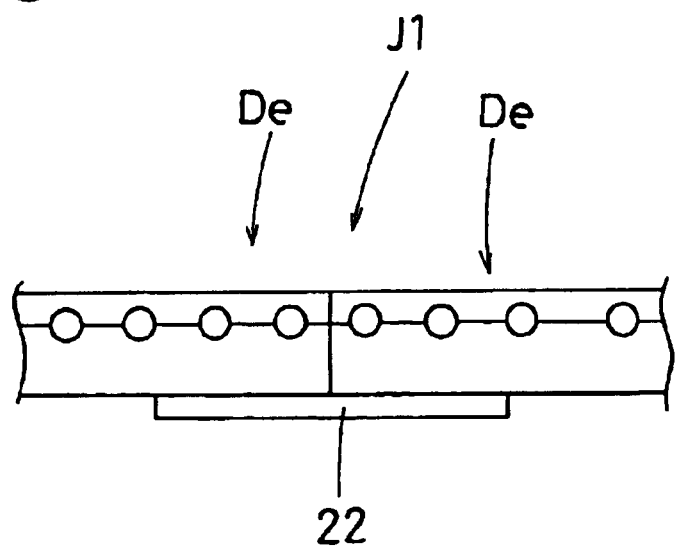

FIG. 8 shows an alternative example of FIG. 5A. In this example, the side edges De of the cut pieces D1 are butt jointed. In this case, the above-mentioned rubber patch 22 is preferably utilized so that the cut pieces D1 retain the butted state.

Example of Rubber Compounds

Table 1 and Table 2 show examples of rubber compounds and their characteristics. The definitions of or measuring methods for the characteristics are as follows.

(1) Mooney Viscosity

Mooney viscosity (ML1+4,130 deg.C.) at a temperature of 130 deg.C. was measured according to Japanese Industrial Standard K6300—"Physical testing methods for unvulcanized rubber", Section 6—"Mooney viscosity test". The measured values are indicated by an index. The larger the index number, the higher the viscosity.

(2) Air Permeability

Air permeability was measured according to the American Society for Testing Materials D1434-75M test method using a specimen vulcanized under a temperature of 170 deg.C. a pressure of 9.8 MPa and a curing time of 12 minutes. The smaller the value, the lower the air permeability.

(3) Flex Crack Resistance

Flex crack resistance was measured according to the Japanese Industrial Standard K6260—"Flex cracking test method for vulcanized rubber" except for the stroke of the reciprocal motion for causing bending strain. The length of the crack was measured after undergone bending deformation by 50% of the specified stroke 1,000,000 times and after undergone bending deformation by 70% of the specified stroke 300,000 times. In the table, the reciprocal of the length is indicated by an index. The larger the index number, the higher the flex crack resistance.

(4) Adhesiveness (4-1) Adhesion 1 (to Cords)

Two perpendicularly crossing laminated plies of parallel 1670 dtex/2 polyester cords (cord count: 48/5 cm) rubberized with the concerned rubber compound were made and vulcanized under a temperature of 150 deg.C., a pressure of 9.8 MPa, and a curing time of 30 minutes. And a peeling test at a speed of 50 mm/minute was made to obtain an adhesive strength. Under 300 N/25 mm is not acceptable.

(4-2) Adhesion 2 (to Sidewall Rubber)

A sheet of the concerned rubber compound and a typical sidewall rubber compound C1 shown in Table 3 (2 mm thickness, 80 mm width, 150 mm length) attached to each other were vulcanized under a pressure of 2 MPa, a temperature of 150 deg.C., a curing time of 30 min. And a peeling test at a speed of 50 mm/minute was made to obtain an adhesive strength. Under 50 kgf/25 mm is not acceptable.

(4-3) Adhesion 3 (to General Topping Rubber)

Using a cord fabric of parallel 1670 dtex/2 polyester cords (cord count: 48/5 cm) whose inside was rubberized with the concerned rubber compound and outside was rubberized with a typical topping rubber compound C2 shown in Table 3, two perpendicularly crossing laminated plies were made and vulcanized under a temperature of 150 deg.C., a pressure of 9.8 MPa, and a curing time of 30 minutes. And a peeling test at a speed of 50 mm/minute was made to obtain an adhesive strength. Under 300 N/25 mm is not acceptable.

Tire Comparison Tests

Table 4 shows results of comparison tests for tire performance. Using the above-mentioned rubber compounds shown in Tables 1 and 2, pneumatic tires of size 185/65R14 (wheel rim size 5.5JX14) having the structure shown in FIG. 1 were made and tested for air leak and durability.

(A) Air Leak Test

The tire mounted on its standard wheel rim was inflated to 300 kPa and then the pressure was measured after 90 days. The rate of decrease is indicated by an index. The larger the index number, the better the performance.

(B) Durability Test 1

Using a tire test drum, the tire mounted on its standard wheel rim and inflated to 190 kPa was run for 20,000 km under a tire load of 5.0 kN at a speed of 80 km/hr. In the table, "ok" means there was no damage after running for the captioned distance. The number means a running distance in percentage of the captioned distance at which cracks or separation occurred.

Table 5 shows results of further comparison tests for tire performance. Pneumatic tires of size 195/65R15 having the structure shown in FIG. 1 were made using the rubber compounds shown in Table 6 and tested for air leak and durability.

(A) Air Leak Test

Same as above (C) Durability Test 2

Using a tire test drum, the tire mounted on its standard wheel rim of size 5.5JX14 and inflated to 190 kPa was run under a tire load of 6.96 kN at a speed of 70 km/hr until any damage occurred on the tire outer surface and the running distance was measured. The running distance is indicated by an index. The larger the index number, the better the durability.

TABLE 1

| Rubber compound | A1 | A2 | A3 | A4 | A5 | A6 | A7 | A8 | A9 | A10 |
|---|---|---|---|---|---|---|---|---|---|---|
| Natural rubber | 90 | 70 | 50 | 90 | 70 | 50 | 70 | 70 | 70 | 70 |
| EXXPRO90-10(*1) | 10 | 30 | 50 | — | — | — | 30 | 30 | 30 | 30 |
| Butylbromide | — | — | — | 10 | 30 | 50 | — | — | — | — |
| Carbon (Table 3) | | | | | | | | | | |
| N219 | 50 | 50 | 50 | 50 | 50 | 50 | 45 | — | — | 25 |
| N234 | — | — | — | — | — | — | — | — | — | — |
| N326 | — | — | — | — | — | — | — | 50 | 60 | 25 |
| N330 | — | — | — | — | — | — | — | — | — | — |
| N550 | — | — | — | — | — | — | — | — | — | — |
| Stearic acid | 2 | 2 | 2 | 2 | 2 | 2 | 2 | 2 | 2 | 2 |
| Tackifier | 4 | 4 | 4 | 4 | 4 | 4 | 4 | 4 | 4 | 4 |
| Insoluble sulfur | 3.5 | 3.5 | 3.5 | 3.5 | 3.5 | 3.5 | 3.5 | 3.5 | 3.5 | 3.5 |
| Hydrozincite | 5 | 5 | 5 | 5 | 5 | 5 | 5 | 5 | 5 | 5 |
| Age resistor | 2 | 2 | 2 | 2 | 2 | 2 | 2 | 2 | 2 | 2 |
| Accelerator | 1 | 1 | 1 | 1 | 1 | 1 | 1 | 1 | 1 | 1 |
| Mooney viscosity | 133 | 140 | 145 | 127 | 135 | 140 | 125 | 129 | 159 | 135 |
| Air permeability | 32 | 20 | 13 | 32 | 19.8 | 12.5 | 20.5 | 20.1 | 18.1 | 20 |
| Flex crack resistance | | | | | | | | | | |
| 50% | 131.1 | 109.9 | 65.9 | 104.9 | 87.9 | 52.7 | 244.8 | 103.9 | 59.8 | 105 |
| 70% | 12.2 | 9.5 | 5.7 | 9.8 | 7.8 | 7.8 | 15.6 | 9.7 | 5.6 | 9.4 |
| Adhesion | | | | | | | | | | |
| 1 (N/25 mm) | 327.9 | 320.7 | 312.4 | 314.4 | 310.5 | 301.5 | 327.1 | 304.7 | 301.5 | 312.6 |
| 2 (kgf/25 mm) | 137.4 | 99.6 | 57.2 | 138.7 | 104 | 57 | 101.6 | 94.6 | 91.8 | 76 |
| 3 (N/25 mm) | 345.1 | 336.8 | 314.5 | 334 | 320.5 | 303.4 | 343.5 | 319.9 | 316.7 | 317.2 |

| Rubber compound | B1 | B2 | B3 | B4 | B5 | B6 | B7 | B8 | B9 | B10 |
|---|---|---|---|---|---|---|---|---|---|---|
| Natural rubber | 100 | 40 | 40 | 60 | 60 | 60 | 60 | 60 | 60 | 60 |
| EXXPRO90-10(*1) | — | — | — | — | — | — | — | — | — | — |
| Butylbromide | — | — | 60 | — | — | — | — | — | — | — |
| Carbon (Table 3) | | | | | | | | | | |
| N219 | 50 | 50 | 50 | — | — | — | — | — | 35 | 70 |
| N234 | — | — | — | 50 | — | — | — | — | — | — |
| N326 | — | — | — | — | 50 | — | — | — | — | — |
| N330 | — | — | — | — | — | 50 | — | — | — | — |
| N550 | — | — | — | — | — | — | 50 | 60 | — | — |
| Stearic acid | 2 | 2 | 2 | 2 | 2 | 2 | 2 | 2 | 2 | 2 |
| Tackifier | 4 | 4 | 4 | 4 | 4 | 4 | 4 | 4 | 4 | 4 |
| Insoluble sulfur | 3.5 | 3.5 | 3.5 | 3.5 | 3.5 | 3.5 | 3.5 | 3.5 | 3.5 | 3.5 |
| Hydrozincite | 5 | 5 | 5 | 5 | 5 | 5 | 5 | 5 | 5 | 5 |
| Age resistor | 2 | 2 | 2 | 2 | 2 | 2 | 2 | 2 | 2 | 2 |
| Accelerator | 1 | 1 | 1 | 1 | 1 | 1 | 1 | 1 | 1 | 1 |
| Mooney viscosity | 100 | 152 | 146 | 133 | 129 | 118 | 105 | 133 | 110 | 189 |
| Air permeability | 39.5 | 9.6 | 9.7 | 16.5 | 16 | 15.8 | 15.3 | 13.5 | 18 | 14.4 |
| Flex crack resistance | | | | | | | | | | |
| 50% | 38.4 | 86.9 | 86.9 | 29.8 | 42.9 | 100 | 93.4 | 33.3 | 179.6 | 35.9 |
| 70% | 1.8 | 6.6 | 6.6 | 5.2 | 3.2 | 4.9 | 5.1 | 4.6 | 12.2 | 3.6 |
| Adhesion | | | | | | | | | | |
| 1 (N/25 mm) | 335 | 248.2 | 244.5 | 288 | 233.1 | 218.7 | 283.6 | 224.5 | 270.8 | 335.4 |
| 2 (kgf/25 mm) | 102.1 | 33.3 | 32.9 | 73.9 | 46.7 | 42.2 | 62.6 | 43.7 | 69.2 | 82.3 |
| 3 (N/25 mm) | 342.1 | 255.1 | 252 | 296.9 | 240.1 | 225.2 | 292.4 | 251.8 | 278.9 | 345.4 |

(*1)halogenated isobutylene-paramethyl styrene copolymer

TABLE 2

| Rubber compound | C1 | C2 |
|---|---|---|
| Natural rubber | 40 | 70 |
| Butadiene rubber | 60 | — |
| Styrene butadiene rubber | — | 30 |
| Carbon black | | |
| N550 | 60 | — |
| N330 | — | 50 |
| Plasticizer | | |
| Aroma oil | 2 | — |
| Mineral oil | — | 10 |
| Stearic acid | 2 | 2 |
| Hydrozincite | 2.5 | 5 |
| Insoluble sulfur | 1.5 | 4 |
| Accelerator | 1 | 1 |

TABLE 3

| Carbon black in Tables 1 and 2 | N219 | N234 | N326 | N330 | N550 | N660 |
|---|---|---|---|---|---|---|
| Iodine adsorption number (mg/g) | 116 | 119 | 86 | 71 | 45 | 27 |
| Specific surface area (nitrogen adsorption method) (m2/g) | 112 | 121 | 83 | 76 | 42 | 31 |
| Dibutyl phthalate adsorption number (ml/100 g) | 83 | 120 | 72 | 102 | 117 | 87 |
| Dibutyl phthalate adsorption number (compressed sample) (ml/100 g) | 80 | 78 | 70 | 85 | 84 | 70 |

TABLE 4

| Tire | Ex.1 | Ex.2 | Ex.3 | Ex.4 | Ex.5 | Ex.6 | Ex.7 | Ex.8 | Ex.9 | Ex.10 |
|---|---|---|---|---|---|---|---|---|---|---|
| Topping rubber | | | | | | | | | | |
| Inside | A2 | A4 | A5 | A6 | A2 | A4 | A5 | A6 | A2 | A2 |
| Outside | A2 | A4 | A5 | A6 | C2 | C2 | C2 | C2 | A2 | C2 |
| Thickness T2 (mm) | 0.45 | 0.4 | 0.41 | 0.49 | 0.44 | 0.4 | 0.41 | 0.48 | 0.46 | 0.45 |
| Insulation rubber layer | none | none | none | none | none | none | none | none | present | present |
| Tire weight(index) | 95 | 95 | 95 | 96 | 95 | 95 | 95 | 96 | 95 | 95 |
| Air leak | 105 | 103 | 106 | 108 | 104 | 103 | 105 | 107 | 105 | 104 |
| Durability | | | | | | | | | | |
| 20000 km | ok | ok | ok | ok | ok | ok | ok | ok | ok | ok |
| 40000 km | ok | ok | ok | ok | ok | ok | ok | ok | ok | ok |
| 60000 km | ok | ok | ok | ok | ok | ok | ok | ok | ok | ok |

| Tire | Ref.1 | Ref.2 | Ref.3 | Ref.4 | Ref.5 | Ref.6 | Ref.7 |
|---|---|---|---|---|---|---|---|
| Topping rubber | | | | | | | |
| Inside | C2 | B1 | B2 | B4 | B7 | B10 | B4 |
| Outside | C2 | C2 | C2 | C2 | C2 | C2 | C2 |
| Thickness T2 (mm) | 0.9 | 0.32 | 0.48 | 0.41 | 0.34 | 0.56 | 0.42 |
| Insulation rubber layer | none | none | none | none | none | none | present |
| Tire weight(index) | 100 | 95 | 95 | 95 | 95 | 96 | 95 |
| Air leak | 100 | 86 | 112 | 105 | 108 | 110 | 105 |
| Durability | | | | | | | |
| 20000 km | ok | ok | 60 | ok | ok | ok | ok |
| 40000 km | ok | ok | — | ok | 70 | 85* | ok |
| 60000 km | ok | 70* | — | 68* | — | — | 70 |

*Tire inner surface cracked.

TABLE 5

| Tire | Ex.11 | Ex.12 | Ex.13 | Ex.14 | Ex.15 | Ref.12 | Ref.13 | Ref.17 | Ref.18 | Ref.11 | Ref.14 | Ref.15 | Ref.16 |
|---|---|---|---|---|---|---|---|---|---|---|---|---|---|
| Topping rubber | | | | | | | | | | | | | |
| Inside | R2' | R2' | R2' | R2' | R2' | R3 | R2 | R2" | R2' | R1 | R2 | R2 | R2 |
| Outside | R1 | R1 | R2' | R2' | R1 | R1 | R1 | R1 | R1 | R1 | R1 | R1 | R1 |
| Thickness T2 (mm) | 0.42 | 0.4 | 0.41 | 0.38 | 0.17 | 0.35 | 0.15 | 0.43 | 0.4 | 1.12 | 0.37 | 0.42 | 0.33 |
| Insulation rubber layer | R4 | R4 | R4 | R4 | R4 | R4 | R4 | R4 | R5 | none | none | none | none |
| TQ1/TQ2 | 1.21 | 1.21 | 1.21 | 1.21 | 1.21 | 1.38 | 0.98 | 1.37 | 1.21 | — | — | — | — |
| E*1 (MPA) | 4.8 | 4.8 | 4.8 | 4.8 | 4.8 | — | 3.9 | 5.9 | 4.8 | — | — | — | — |
| E*2 (MPA) | 4.5 | 4.5 | 4.5 | 4.5 | 4.5 | 4.5 | 4.5 | 4.5 | 5.6 | — | — | — | — |
| Tire weight (index) | 96 | 96 | 95 | 96 | 94 | 95 | 95 | 96 | 96 | 100 | 95 | 95 | 94 |
| Air leak | 82 | 80 | 79 | 76 | 102 | 77 | 104 | 81 | 78 | 100 | 95 | 95 | 89 |
| Durability | 108 | 105 | 102 | 104 | 88 | 67 | 80 | 79 | 78 | 100 | 75 | 102 | 74 |

TABLE 6

| Rubber compound in Table 5 | R1 | R2 | R2' | R3 | R4 | R5 | R2" |
|---|---|---|---|---|---|---|---|
| Natural rubber | 70 | 70 | 70 | 40 | 30 | 30 | 70 |
| Styrene butadiene rubber | 30 | — | — | — | — | — | — |
| EXXPRO90-10(*1) | — | — | — | — | — | — | 30 |
| Butylbromide | — | 30 | 30 | 60 | 70 | 70 | — |
| Carbon | 45HAF | 45HAF | 55HAF | 55HAF | 60GPF | 60HAF | 65HAF |

TABLE 6-continued

| Rubber compound in Table 5 | R1 | R2 | R2' | R3 | R4 | R5 | R2" |
|---|---|---|---|---|---|---|---|
| Stearic acid | 2 | 2 | 2 | 2 | 1 | 1 | 2 |
| Tackifier | 0 | 5 | 5 | 5 | 5 | 5 | 5 |
| Sulfur | 4 | 3.75 | 3.75 | 3.75 | 1 | 1 | 3.75 |
| Accelerator | 1 | 1 | 1 | 1 | 1 | 1 | 1 |
| Hydrozincite | 5 | 5 | 5 | 5 | 4 | 4 | 5 |
| Plasticizer (oil) | 10 | 0 | 0 | 0 | 5 | 5 | 0 |

(*1)Halogenated isobutylene-paramethyl styrene copolymer

What is claimed is:

1. A pneumatic tire comprising
   a tread portion,
   a pair of sidewall portions,
   a pair of bead portions,
   a carcass comprising a ply of cords defining the innermost reinforcing cord layer extending between the bead portions,
   an airtight layer disposed inside said cords of the carcass ply along the inner surface of the tire, covering the substantially entire inner surface of the tire,
   the airtight layer is made of a first air-impermeable rubber compound and a second air-impermeable rubber compound,
   the first air-impermeable rubber compound forms an outer layer coming into contact with the cords, and the first air-impermeable rubber compound comprises 10 to 50 weight % of halogenated butyl rubber and/or halogenated isobutylene-paramethyl styrene copolymer and 90 to 50 weight % of diene rubber in its rubber base,
   the second air-impermeable rubber compound forms an inner layer defining the tire inner surface, and the second air-impermeable rubber compound comprises 60 to 100 weight % of halogenated butyl rubber and/or halogenated isobutylene-paramethyl styrene copolymer and 40 to 0 weight % of diene rubber in its rubber base,
   a minimum torque of the first air-impermeable rubber compound is at least 1.1 times a minimum torque of the second air-impermeable rubber compound, wherein the minimum torque is measured under a temperature of 170 deg.C., an angularly amplitude of plus/minus 1 degrees, and an oscillation of 100 cycles/minute, and
   the thickness of the airtight layer measured from the inner surface of the tire to the cords of the carcass ply being in a range of from 0.2 to 0.7 mm.

2. The pneumatic tire according to claim 1, wherein
   the thickness of the first air-impermeable rubber compound forming the outer layer measured from the innermost points of the carcass cords to the inner surface of the outer layer is in a range of from 0.1 to 0.2 mm.

3. The pneumatic tire according to claim 1 or 2, wherein
   the complex elastic modulus E*1 of the first air-impermeable rubber compound is not more than 5.5 MPa, and
   the complex elastic modulus E*2 of the second air-impermeable rubber compound is not more than 5.0 MPa and wherein the complex elastic modulus is measured at a Temperature of 70 deg. C., a Frequency of 10 Hz, an Initial strain of 10% and a Dynamic distortion of plus/minus 1%.

4. The pneumatic tire according to claim 1 or 2, wherein
   the complex elastic modulus E*1 of the first air-impermeable rubber compound is not more than 5.5 MPa, and
   the complex elastic modulus E*2 of the second air-impermeable rubber compound is not more than 5.0 MPa and smaller than the complex elastic modulus E*1, and wherein the complex elastic modulus is measured at a Temperature of 70 deg. C., a Frequency of 10 Hz, an Initial strain of 10% and a Dynamic distortion of plus/minus 1%.

5. The pneumatic tire according to claim 1, wherein
   said first air-impermeable rubber compound is a topping rubber for said cords of the carcass ply which covers at lest the inside of the carcass ply.

6. The pneumatic tire according to claim 5, wherein
   the outside of the carcass ply is covered with a topping rubber compound different from said first air-impermeable rubber compound.

* * * * *